March 19, 1946.                T. JENSEN                 2,397,011
                                WIRE WHIP
                            Filed May 8, 1943          2 Sheets-Sheet 1

INVENTOR
THORMOD JENSEN
BY George S Hastings
ATTORNEY

March 19, 1946.　　　　T. JENSEN　　　　2,397,011
WIRE WHIP
Filed May 8, 1943　　　2 Sheets-Sheet 2
FIG. 3
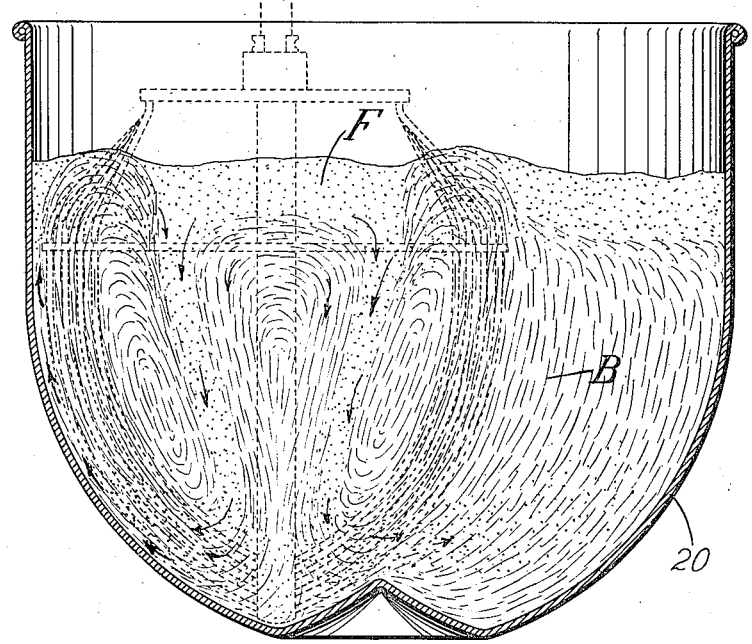
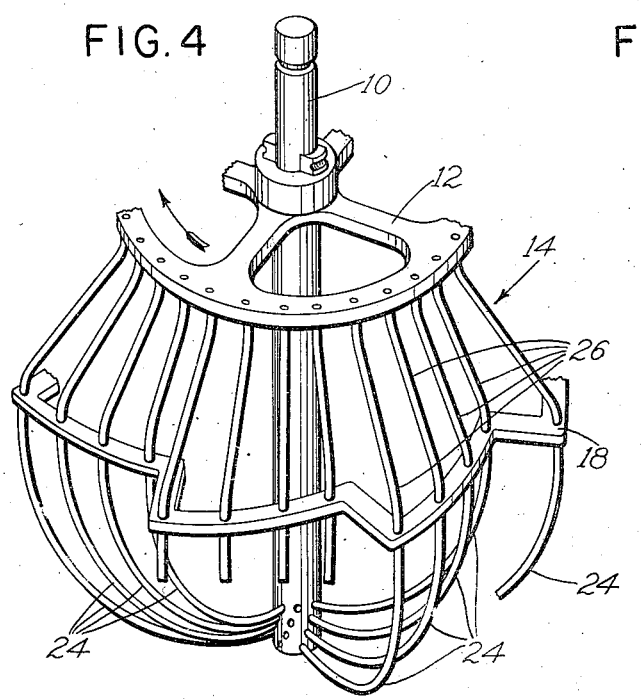
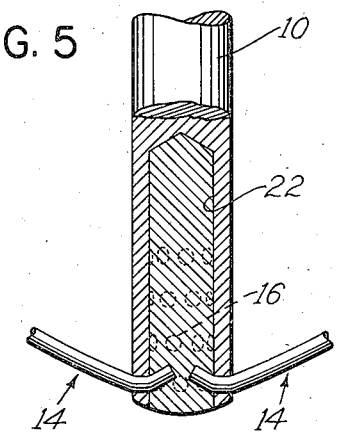
FIG. 4
FIG. 5
INVENTOR
THORMOD JENSEN
BY George S Hastings
ATTORNEY Patented Mar. 19, 1946

2,397,011

UNITED STATES PATENT OFFICE 2,397,011

WIRE WHIP

Thormod Jensen, Laurelton, N. Y., assignor to American Machine & Foundry Company, a corporation of New Jersey Application May 8, 1943, Serial No. 486,138

5 Claims. (Cl. 259—129)

This invention relates to an improved wire whip or whisk of the type which is revolved on a vertical shaft of a power-driven mixer to mix the ingredients of a "foam" batch. "Foam" batches generally have ingredients which are beaten by the whip to incorporate air therein until the proper mixing and aeration thereof is obtained, and flour is then added to the batch to be "folded in" by the whip. Examples of "foam" batches are angel food cake (which contains sugar, egg whites and flour), sponge cake (which contains whole eggs and yolks, sugar and flour) and marshmallow.

One of the main objects of the invention is to provide an improved whip consisting of wire loops which are offset radially relative to the axis of the whip to produce a scooping action on the batch whereby during the rotation of the whip the ingredients of the batch will be displaced inwardly toward the center of the whip and also thrown outwardly through the wires. As the mixing of the batch progresses, it expands due to the formation of air bubbles therein by the beating action just mentioned.

In the Dehuff Patent No. 1,998,120, there is shown a wire whip construction which has a similar scooping action on the batch ingredients. However the radial offset of Dehuff's wire loops is such that at high speeds the batch is swirled around so much that most of the batch ingredients within the whip are thrown out through the wires, and only the outermost wires have any mixing action on the batch. Therefore with Dehuff's whip much greater time is needed to properly mix and aerate the batch. In my construction, the wires are arranged in several series, the various wires of each series being radially offset to produce the above mentioned scooping. Dehuff has only two series of wires, wherefore the offset thereof may be as great as six (6) inches, whereas with my construction a greater amount of the batch stays inside the whip, the speed being adjusted to maintain about an inch of the batch inside the whip. To this end, in my construction, the total radial offset in a single series of wires may be only 1, 1½ or 2 inches. Moreover I have found that 4, 6 or 8 series of wires having an offset of the degree just stated will operate satisfactorily, although it will take considerably longer to mix the ingredients with four series of wires than with eight series; since any single series of wires will not engage too much material and therefore will maintain an efficient circulation of the batch ingredients.

A further object of the invention is to provide a wire whip having members above the radially offset loop portions, and it may be noted that the offset may be dispensed with if desired, and operating to "fold in" the flour. These members are arranged to circulate inwardly and downwardly through the whip the flour, which is added to the top of the batch after it has been properly mixed and aerated as described above to be "folded in" the batch ingredients, whereby the flour will be carried outwardly through the loop portions and effectively dispersed in the batch. Heretofore various expedients, such as slowing down the speed of the whip, where resorted to for "folding in" the flour, but no prior wire whips had a construction capable of "folding in" the flour in as short a time and without loss of volume or lumping of the flour.

In the accompanying drawings which form a part of this specification and in which like characters of reference indicate the same or like parts:

Fig. 3 is a sectional side elevation of a mixing bowl with the whip shown therein in broken lines, illustrating the action of the wire whip after a quantity of flour is deposited on top of the batch to be "folded in";

Fig. 4 is a perspective partial view of the improved wire whip with portions of the wires broken away to more clearly illustrate the offset and spiral formation of the wires; and Fig. 5 is a sectional detail view of the lower end of the stem of the wire whip, on an enlarged scale.

Figure 1:
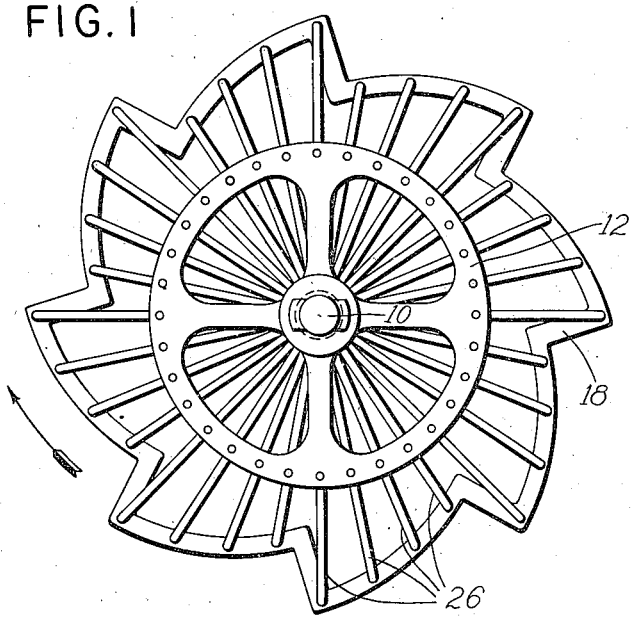
Fig. 1 is a plan view of the improved wire whip.
Figure 2:
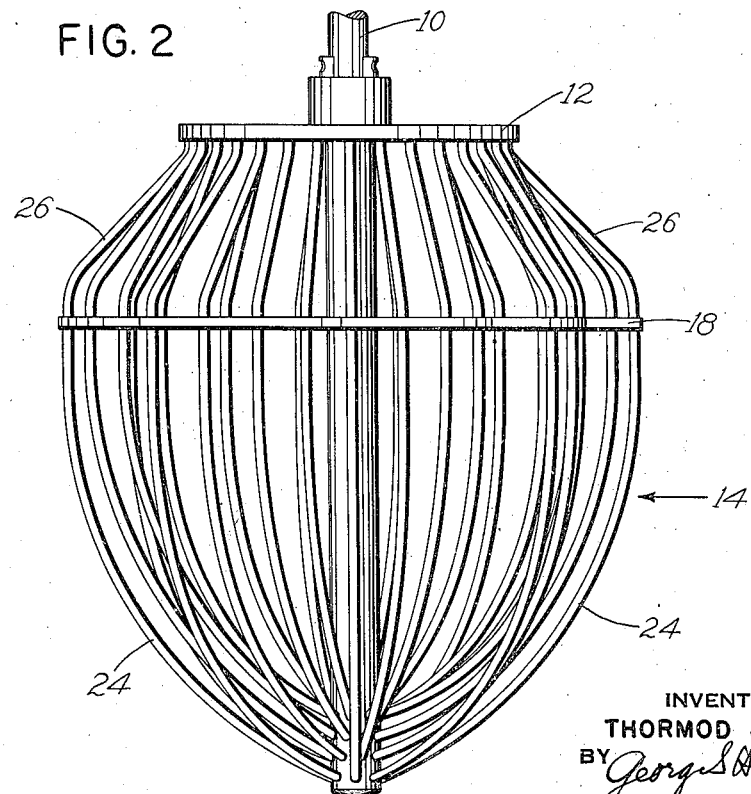
Fig. 2 is a side elevation of the same.

Referring to the drawings, the improved wire whip consists of a stem 10 whose upper end is adapted to be secured in a socket provided on the vertical shaft of a mixing machine of any suitable type such, for example, as the one shown in the Dehuff Patent No. 2,181,079. When mounted on the type of mixer shown in the Dehuff patent, the wire whip rotates upon its own vertical axis and also in an orbital path concentric with the center of the mixing bowl. On stem 10 is mounted a concentric annular frame or spider 12 on which the upper ends of all the wires 14 are fixed. The wires are bent to form loops and their lower ends are secured in holes 16 provided in the lower end of stem 10.

In the particular embodiment of the invention illustrated herein, eight series of wires, each series consisting of four wires, is provided, but it will be understood that a greater or lesser number of series and/or wires may be employed if desired. The various wires of each series are of different lengths, wherefore the wire loops of each series may be successively offset from the spindle 10 with respect to one another so that each series of wires forms a separate scoop. Holes 16 may be arranged in several spiral series to produce a corresponding spiral formation of the lower portions of each series of wire loops. Intermediate their ends, the wires are further secured in a supporting ring 18 which has a star-shaped configuration corresponding to the offset of the lower portions 24 of the various wires of each series radially from spindle 10 with respect to one another.

The lower end of stem 10 is provided with a hollow portion 22 (Fig. 5) which, after the wires are inserted in their proper holes 16, is filled with lead or similar material to prevent said wire ends from becoming loose whereby replacement of said wires is facilitated if necessary.

I have tested wire whips constructed in accordance with my invention and having a total radial offset (that is the radial distance from the innermost wire loop of one series to the outermost wire loop of an adjoining series) of 1, 1½ and 2 inches on commercial "foam" batches in bakeries, and have found that the time required to properly mix and aerate the batch prior to addition of the flour was approximately halved, as compared with prior wire whips which had no radial offset of the wire loops. Suitable speeds for this mixing operation have been found to be 200-300 R. P. M., and 240 R. P. M. has been found to be satisfactory.

It will be noted that the upper portions 26 of the wires are substantially straight. This arrangement of the wire portions 26, which have different inclinations upwardly from the portions of the ring 18 through which they project serves, as the wire whip is rotated in the direction of the arrow (Figs. 1 and 4), to constrict the flour, which is added to the top of the mixed batch to be "folded in," between the outermost wire portion 26 of each series and the immediately adjoining wire thereof, and thereby force it inwardly and downwardly, this action being continued by the remaining wire portions 26. Thus the flour is circulated inwardly and downwardly through the wire portions 26 in a manner which will now be more fully described.

As illustrated in Fig. 3, the action of the wire portions 26 revolving in a mixing bowl 20 causes the flour F added to the mixed "foam" batch B, whose top is at the level of the ring 18, to circulate inwardly and downwardly through the wire portions 26 and downwardly through the batch until expelled by the centrifugal action of the wire portions 24, as shown by the arrows in Fig. 3. I have found that my wire whip will "fold in" the flour in a shorter period of time with a slower speed of rotation of the whip than was possible heretofore. I have found that the speed of my whip may be reduced to about 50 R. P. M. for "folding in" the flour, but it is desirable to increase the speed to about 100 R. P. M. in the final stage of this operation to disperse any unmixed particles through the batch. Since the flour is "folded in" quickly with my whip, and at a lower speed of rotation, there is less likelihood of the air being beaten out of the batch or the air bubbles being disrupted by the relatively harder flour particles. In this connection it may be noted that some bakers still "fold in" the flour by hand after mixing the other ingredients with a wire whip.

In the operation of the beater prior to the addition of the flour, the batch initially fills only the lower portion of the mixing bowl, but as air is beaten into it it expands until it reaches the level of the member 18, and during this expansion the inward and outward circulation of the batch ingredients through the wires produces a uniform mixing. Upon addition of the flour, a readily discernible inward and downward circulation of the flour particles through the wire-portions 26 is set up. The flour particles then descend downwardly through the interior of the whip as indicated by the arrows in Fig. 3 and are then expelled through the wire portions 24 and surge upwardly, as indicated by the arrows in Fig. 3, mainly between the whip and the adjoining side of the bowl, to be impelled downwardly again by the wire portions 26.

It will be understood that the radial offset of the portions 24 may be dispensed with. While I have described my invention in its preferred form, I desire it to be understood that various modifications thereof may be made and that no limitations upon the invention are intended other than are imposed by the scope of the appended claims.

What is claimed is:

1. In a whip, the combination with a support revoluble about a vertical axis, of at least four series of wires, the wires of each series being of different lengths and extending downwardly from said support and having their ends fixed in said support and having portions thereof bent upwardly into loops defining arcs which are eccentric to each other and disposed at different distances from the axis of rotation of said support, the loops of each series of wires being progressively offset from said axis of rotation adjacent the upper portions of said wires to provide a total radial offset of 1–2 inches the upper ends of said wires being fixed in said support at equal radial distances from said axis of rotation.

2. In a whip, the combination with a support revoluble about a vertical axis, of several series of wires, the wires of each series being of different lengths and extending downwardly from said support and having their ends fixed in said support and having portions thereof bent upwardly into loops defining arcs which are eccentric to each other and disposed at different distances from the axis of rotation of said support, the upper ends of said wires being fixed in said support, and a ring provided with several series of holes through which the portions of said wires adjacent their upper ends pass, the holes of each series being disposed at different radial distances from said axis of rotation corresponding to different distances of said arcs from the axis of rotation of the support.

3. In a "foam" whip, the combination with a support revoluble about a vertical axis, of several series of wires having their ends fixed in said support and having portions thereof bent upwardly into arcuate loops arranged to circulate the ingredients of a "foam" batch from within the whip outwardly through the wires when the whip is revolved about its vertical axis in a "foam" batch, a ring having series of holes through which the wires pass, the holes of each series being progressively offset from said axis of revolution to provide a progressive radial offset of the wires of each series, to circulate the ingredients of a "foam" batch from within the whip outwardly through the wires and also inwardly through the wires, and means on said support above said upwardly bent wire portions adapted to "fold in" flour added to the top of a "foam" batch which has been previously mixed by rotation of the whip therein, said means including extensions of said wires extending upwardly from said ring, said extensions being of different lengths and having different upward inclinations from said ring to create a circulation of the flour inwardly through said extensions and downwardly through the interior of the whip, whereby the flour particles will be dispersed outwardly through the wires into the batch.

4. In a whip, the combination with a support revoluble about a vertical axis, of at least four series of wires, the wires of each series being of different lengths and extending downwardly from said support and having their ends fixed in said support and having portions thereof bent upwardly into loops defining arcs which are eccentric to each other and disposed at different distances from the axis of rotation of said support, the loops of each series of wires being progressively offset from said axis of rotation adjacent the upper portions of said wires to provide a total radial offset of 1-2 inches, the upper ends of said wires being fixed in said support at equal radial distances from said axis of rotation, and means engaging said wires adjacent the upper ends thereof for maintaining the loops of individual wires of each series in the desired positions during the rotation of said support in a batch of material which is to be mixed.

5. A whip comprising a support revoluble about a vertical axis within a mixing bowl, several series of wires mounted on said support, the wires of each series having portions thereof bent upwardly into loops defining arcs which are eccentric to each other and disposed at different distances from the axis of rotation of said support, a vertical stem carried by said support, several series of holes formed in the lower end of said stem, the holes of each series being spirally arranged, and said wires being fixed in said holes, said wires having upwardly extending extensions above said loops adapted to "fold in" flour added to the top of a "foam" batch which has been previously mixed by rotation of the whip therein, and said extensions having different upward inclinations to create a circulation of the flour inwardly through said extensions and downwardly through the interior of the whip whereby the flour particles will be dispersed through the wires into the batch and an upward surge of the batch into the path of said extensions will be created along the adjoining side of the mixing bowl to be impelled downwardly by said extensions.

THORMOD JENSEN.